Patented Jan. 12, 1932

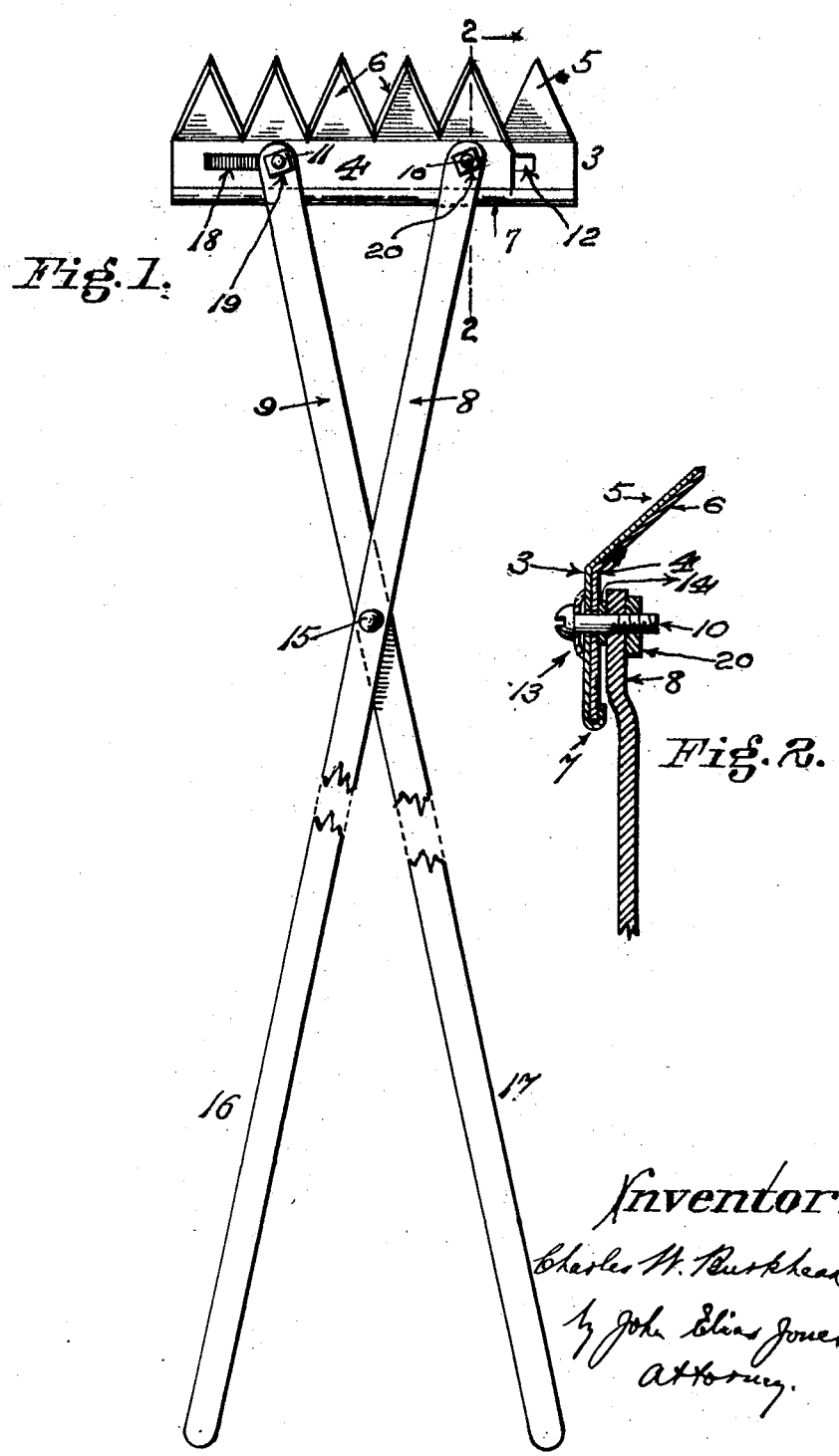

1,841,233

UNITED STATES PATENT OFFICE

CHARLES W. BURKHEAD, OF BELLEVUE, KENTUCKY

HAND-OPERATED LAWN-EDGE OR GRASS-TRIMMING TOOL

Application filed February 8, 1929. Serial No. 338,524.

This invention relates to grass trimmers or clippers used along the edges or skirtings of lawns, walks, or drive-ways, and the object of my present improvement is to provide a convenient, simple, inexpensive and efficient hand-operated tool or implement that embodies a pair of coacting reciprocal cutter-blades. Each blade is armed with a series or row of forwardly-projecting triangular knife-sections or cutter-teeth of the common harvester-bar type and adapted to freely enter between the standing or the drooping blades of grass or other unduly extending rank growth. Suitable elongated straight lever handles are pivotally-held together to the rear of said twin cutter-blade structure so that the operator can manipulate and control the improved implement in a free and easy manner while in a standing, or in a partly stooping position that will not ordinarily tire him or cause him undue inconvenience or pain that would otherwise ensue in either a full stooping or a kneeling posture.

Figure 1 is a plan view of the implement in its closed state, and in which the cutter-teeth of both bars or heads are in full lapping or alignment contact and ready for severing across each other when their extension lever handles are drawn both toward and away from each other, and Figure 2 is a cross-section taken on the dotted-line 2, 2, of said Figure 1 showing the structure of the twin cutter-blade head of my improved device herein, and with the adjacent manipulating hand-lever, broken slightly to the rear of the said cutter-blade head.

In these views, 3 indicates the lower or bottom cutter-bar of the said twin cutter-blade head, and 4 the upper companion cutter-bar of said twin-bladed head. Each of the said two heads 3 and 4 is armed with a series or multiple of forwardly-projecting pointed triangular sharp edged knife-sections or cutting-teeth 5 and 6, respectively.
The outer sloping sharp edges of the teeth of the upper bar coact with those of the lower bar when the two bars are reciprocated across each other in severing or clipping the grass or unduly extended rank growth.
In order that the two blade-heads may properly coact, the rear edge of the lower blade is bent upwardly and forwardly into a U-shape (cross-section) gutter or guideway 7 in which the straight rear edge of the upper blade rests and reciprocates crosswise in the cutting operation of the said teeth along the coinciding serrated fore edges of said blades 3 and 4. The said guideway can be easily kept properly lubricated for the transverse movements of the pair of blades, across each other, in the said operation of the implement when trimming the grass or unduly extended rank growth.

The said teeth 5 and 6 are flared upwardly at an angle of 45°, more or less, so as to lie horizontal in cutting use and thereby compensate for the proper holding of the implement in the standing or upright posture of the operator through the provision and use of the elongated straight lever handles or levers 8 and 9. The fore end of lever 8 is pivotally connected by means of a vertical screw-bolt 10 and a nut 20 to the upper blade 4 and the fore end of the other lever 9 is also pivotally connected by means of a like vertical screw-bolt 11 to the lower blade 3, with said screw-bolt 10 passing through a slot 12 in the lower blade 3 for free passage to and fro. The slotted heads of said screw bolts are each in yielding or cushioned contact with compensating spring-plates 13, the latter being best shown in Fig. 2.

A spacing-washer or filler-block 14 is placed on the said screw-bolt 10 between the fore end of the lever 8 and the said upper blade 4, as best seen in Fig. 2, for the purpose of properly mounting said fore end of lever 8 and pivotally connecting it with the upper blade and providing compensation in the operation of the said lever 8 when swung into either closed or open position on the pivot-connection 15 and manipulated by means of the diagonally-crossed rearwardly-extended handle-portions 16 and 17, respectively, in driving said twin pair of serrated cutter-blades across each other in clipping the grass.

The fore end of the companion lever 9 is pivotally attached to the lower blade or base-plate 3 by means of the said screw-bolt 11 that passes through the slot 18 in the upper blade 4, with its slotted head on the underside of the latter and provided at its upper or outer end with a fastening-nut 19 that does not prevent the two blades 3 and 4 sliding to and fro in due reciprocal relation to each other in the action of the cutter-teeth along their fore edges when clipping the grass.

It will be readily seen that the two cutter members of my implement herein can very easily be separated for packing and shipping, as well as for repairs or for the sharpening or the straightening of the teeth that become necessary in the use of the device from time to time.

I claim:—

1. In a hand-operated lawn-edging and rank-growth trimming implement, the combination of an upper transverse blade-member having a multiple cutter-tooth angularly-flared fore edge and a straight plane rear edge, a lower transverse base blade-member having a corresponding multiple cutter-tooth angularly-flared fore edge, both said blade-members being arranged in reciprocable grass and uneven rank-growth trimming relation, and a pair of straight pivotally-connected and diagonally-crossed manipulating straight handles with their respective fore ends pivotally connected to the said pair of cutter blade-members for reciprocal grass and uneven rank-growth trimming relation.

2. In a hand-operated lawn-edging and grass-trimming implement, the combination of an upper transverse blade-member having a multiple cutter-tooth angularly-flared fore edge and a straight plane rear edge, a lower transverse base blade-member having a corresponding multiple cutter-tooth angularly-flared fore edge in coinciding reciprocable trimming-relation with the said flared cutter-tooth edge of the upper blade-member and with its rear edge bent upwardly and forwardly into horizontal-U-shape cross-section for the provision of a transverse guideway for the said straight rear edge of said upper blade-member, a pair of straight pivotally-connected and diagonally-crosed manipulating handles, said handles at their fore ends being provided with screw bolts for connection with the said upper and lower cutter-members and such cutter-members being provided with longitudinal slots to accommodate said screw-bolts to duly allow free movement of the said pair of cutter-blade members in the trimming of the grass and other undue extended rank-growth to be removed.

In testimony whereof I hereunto affix my signature.

CHARLES W. BURKHEAD.